United States Patent
Hoffmann et al.

(10) Patent No.: US 11,921,748 B1
(45) Date of Patent: *Mar. 5, 2024

(54) METHOD AND APPARATUS FOR USING REPRESENTATIONS OF BLOCKS OF DATA WHEN CONTINUOUSLY COMPARING TWO DATABASES WHICH ARE ACTIVELY BEING KEPT SYNCHRONIZED

(71) Applicant: Gravic, Inc., Malvern, PA (US)

(72) Inventors: John R. Hoffmann, Kennett Square, PA (US); Paul J. Holenstein, Downingtown, PA (US); Bruce D. Holenstein, Media, PA (US); Dylan R. Holenstein, Newtown Square, PA (US)

(73) Assignee: GRAVIC, INC., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,824

(22) Filed: Dec. 5, 2023

Related U.S. Application Data

(63) Continuation of application No. 18/476,784, filed on Sep. 28, 2023, now Pat. No. 11,880,386, which is a
(Continued)

(51) Int. Cl.
*G06F 16/27* (2019.01)
*G06F 16/23* (2019.01)

(52) U.S. Cl.
CPC ........ *G06F 16/273* (2019.01); *G06F 16/2358* (2019.01); *G06F 16/2379* (2019.01)

(58) Field of Classification Search
CPC . G06F 16/273; G06F 16/2358; G06F 16/2379
See application file for complete search history.

(56) References Cited

U.S. PATENT DOCUMENTS

| | | |
|---|---|---|
| 5,870,759 A | 2/1999 | Bauer et al. |
| 6,968,209 B1 | 11/2005 | Ahlgren et al. |

(Continued)

OTHER PUBLICATIONS

FSU means Frame Synchronization Unit, acronymsandslang.com, http://acronymsandslang.com/definition/553255/FSU-meaning.html, 12 pages (date unknown).

(Continued)

*Primary Examiner* — Robert W Beausoliel, Jr.
*Assistant Examiner* — Mohammad S Bhuyan
(74) *Attorney, Agent, or Firm* — Clark A. Jablon

(57) ABSTRACT

An automated method and apparatus are provided for comparing a source database and a target database that are intended to be kept in synchronization with each other. An application processes database changes that are posted to the source database and replicated to the target database. The source database and the target database are made up of blocks of data. Blocks of data from the source database having database changes are collected. These blocks of data are replicated to the target database. Blocks of data from the target database that correspond to the blocks of data from the source database having database changes are read. Representations of the blocks of data from the source database having database changes are compared to representations of blocks of data from the target database that correspond to the blocks of data from the source database having database changes. A corrective action is performed when the comparison indicates that the representations of the blocks of data from the source database having database changes do not match the representations of blocks of data from the target database that correspond to the blocks of data from the source database having database changes. A similar process is performed using "before images" of blocks of data from the source database having database changes and then comparing representations of these "before images" to rep-
(Continued)

Flowchart for a preferred embodiment of an automated method for comparing a source database and a target database that are intended to be kept in synchronization with each other using replication resentations of "current images" of blocks of data from the target database that correspond to the before images of blocks of data from the source database having database changes.

22 Claims, 13 Drawing Sheets

Related U.S. Application Data continuation of application No. 17/466,212, filed on Sep. 3, 2021, now Pat. No. 11,775,560, which is a continuation of application No. 16/548,012, filed on Aug. 22, 2019, now Pat. No. 11,120,047.

(60) Provisional application No. 62/721,215, filed on Aug. 22, 2018.

(56) References Cited

U.S. PATENT DOCUMENTS

| | | |
|---|---|---|
| 7,302,446 B1 | 11/2007 | Boothby |
| 7,882,062 B2 | 2/2011 | Holenstein et al. |
| 7,949,640 B2 | 5/2011 | Holenstein et al. |
| 9,116,862 B1 | 8/2015 | Rath et al. |
| 10,152,506 B1 | 12/2018 | Hoffmann et al. |
| 10,467,223 B1 | 11/2019 | Holenstein et al. |
| 10,642,826 B1 | 5/2020 | Holenstein et al. |
| 10,671,642 B2 | 6/2020 | Brodt et al. |
| 10,705,920 B1 | 7/2020 | Holenstein et al. |
| 2003/0208511 A1 | 11/2003 | Earl et al. |
| 2008/0109496 A1* | 5/2008 | Holenstein .......... G06F 16/2343 |
| 2009/0313311 A1 | 12/2009 | Hoffmann et al. |
| 2011/0173619 A1 | 7/2011 | Fish |
| 2012/0185432 A1 | 7/2012 | Ding |
| 2012/0278282 A1 | 11/2012 | Lu et al. |
| 2013/0138607 A1 | 5/2013 | Bashyam et al. |
| 2016/0100004 A1 | 4/2016 | Anglin et al. |
| 2016/0275150 A1* | 9/2016 | Bournonnais .......... G06F 16/25 |
| 2018/0253483 A1 | 9/2018 | Lee |

OTHER PUBLICATIONS

Kleppmann, Using logs to build a solid data infrastructure (or: why dual writes are a bad idea), Confluent https://www.confluent.io/blog/using-logs-to-build-a-solid-data-infrastructure-or-why-dual-writes-are-a-bad-idea/, 19 pages (May 29, 2015).

Zero Downtime Table Migrations using a Double Write Methodology, gusto.com, https://engineering.gusto.com/old-write/, 12 pages (Aug. 14, 2018).

* cited by examiner

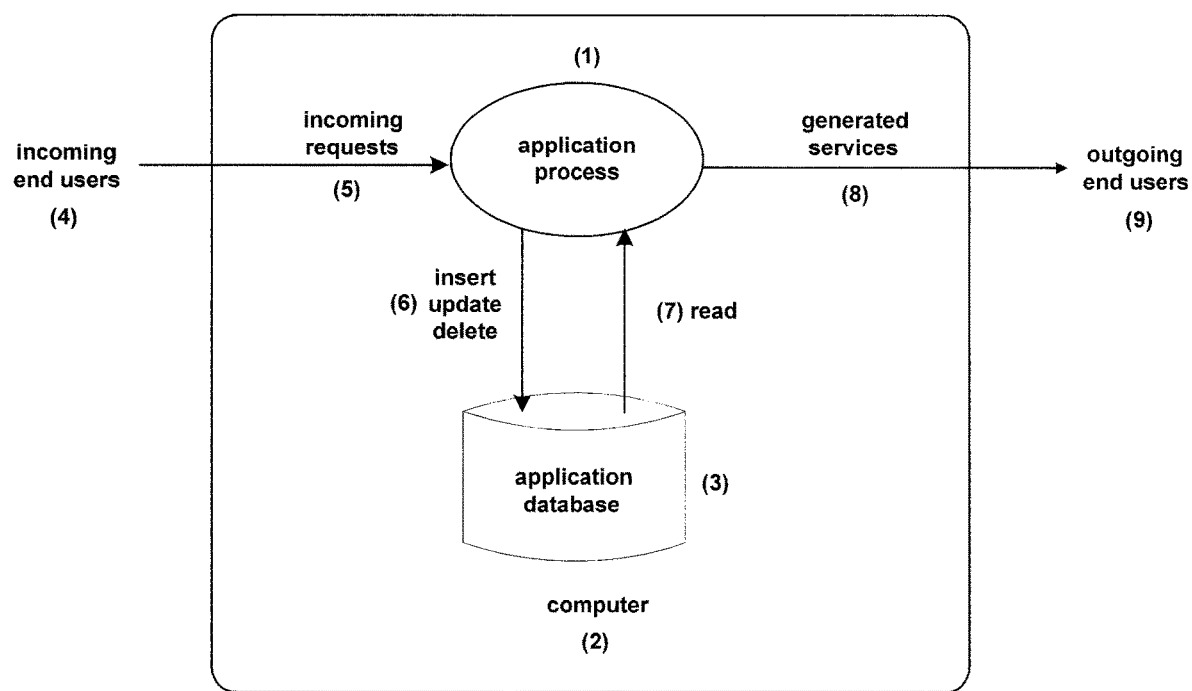
Figure 1: Prior Art - A Computer Application

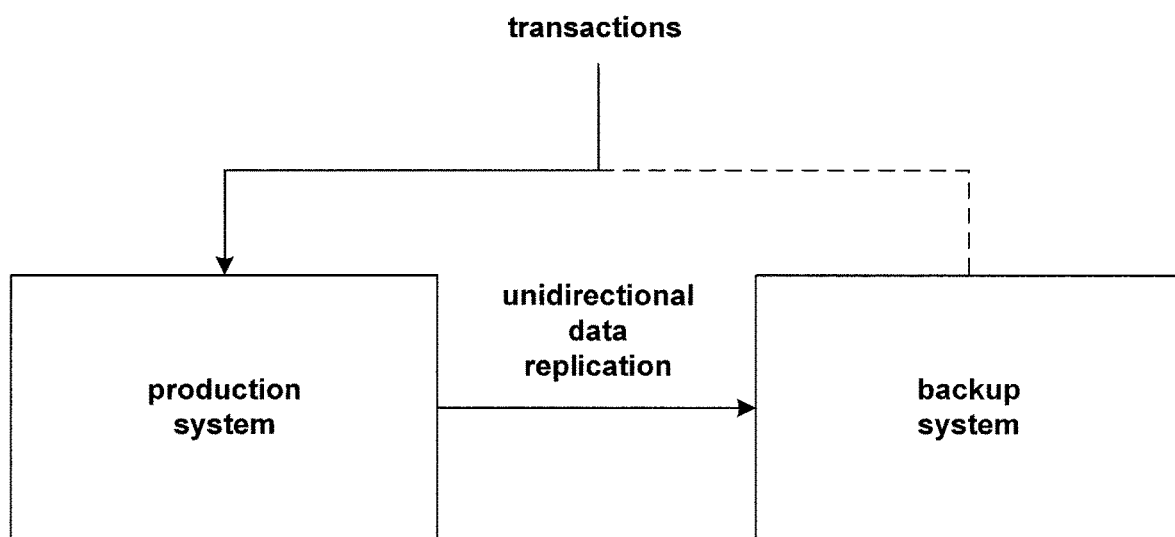
Figure 2: Prior Art - An Active/Backup System

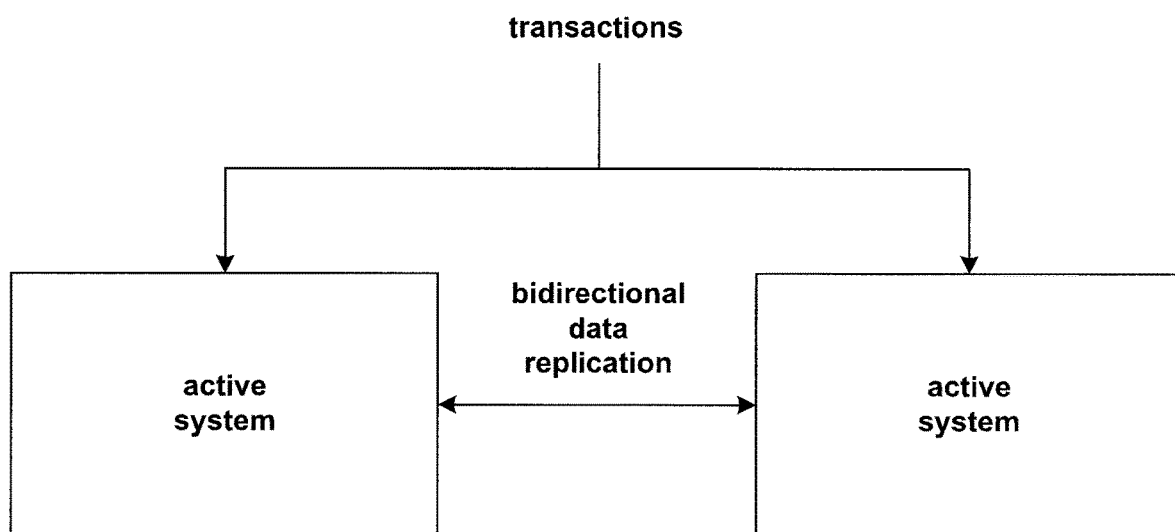
Figure 3: Prior Art - An Active/Active System

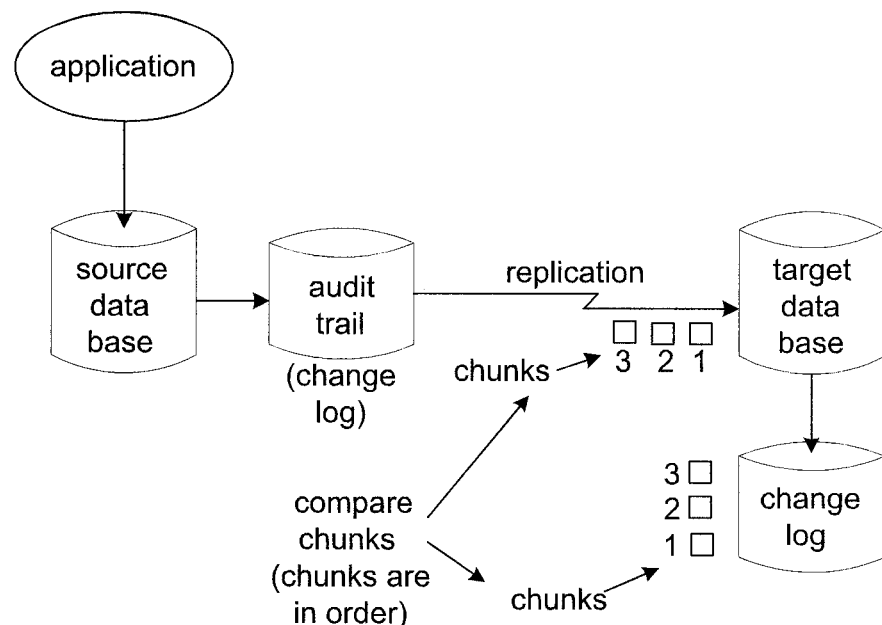
Figure 4: Continuous Compare - Chunks Same Order
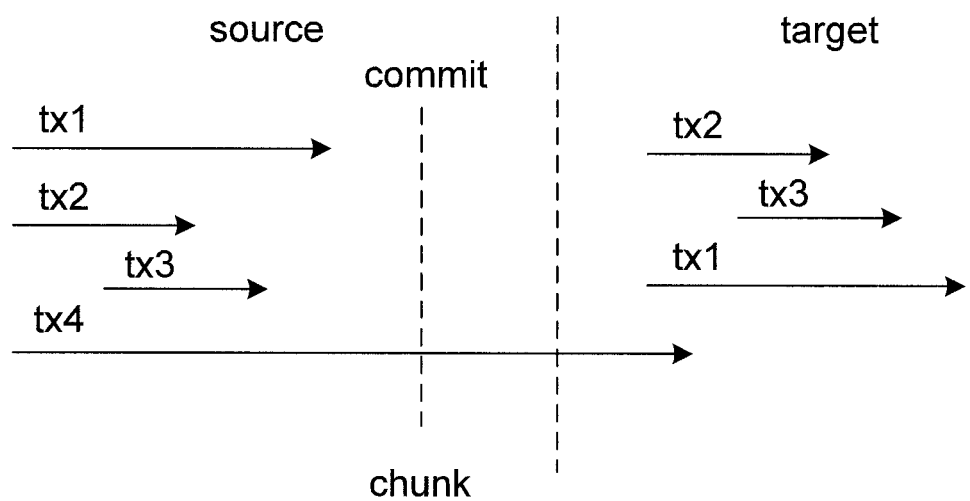
Figure 5: Source/Target Commit Order

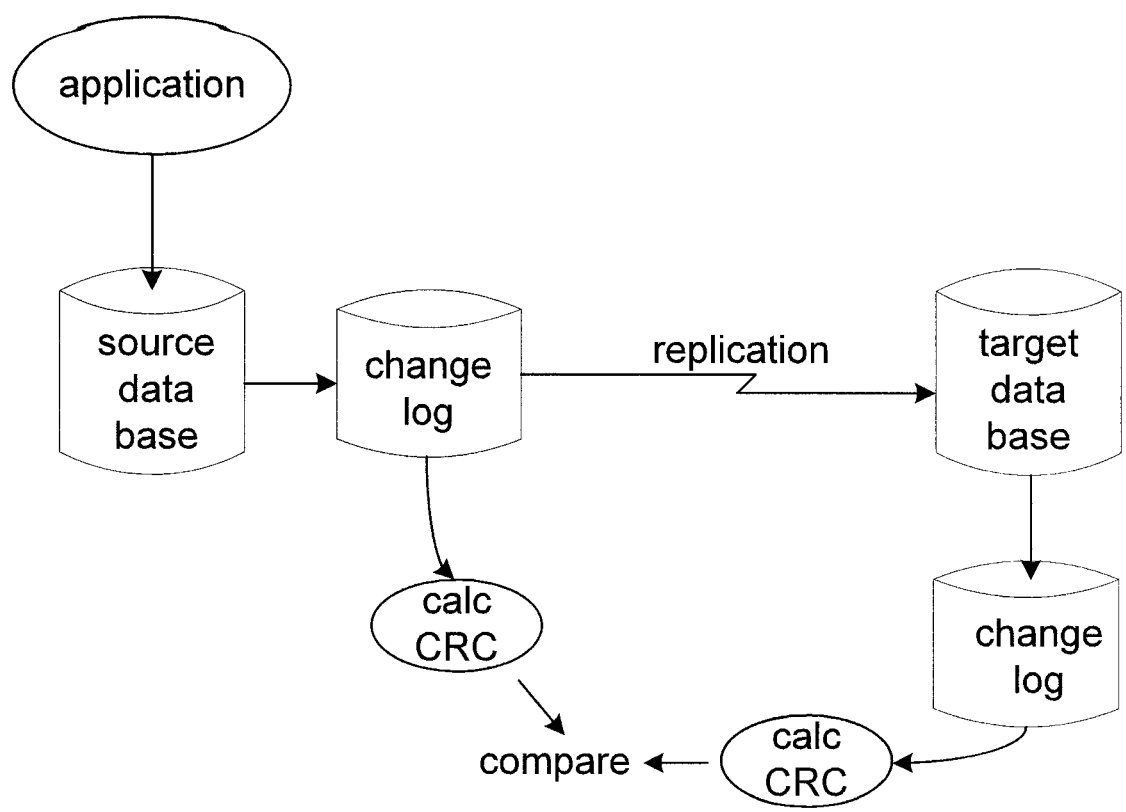
Figure 6: Comparing Change Logs via CRCs

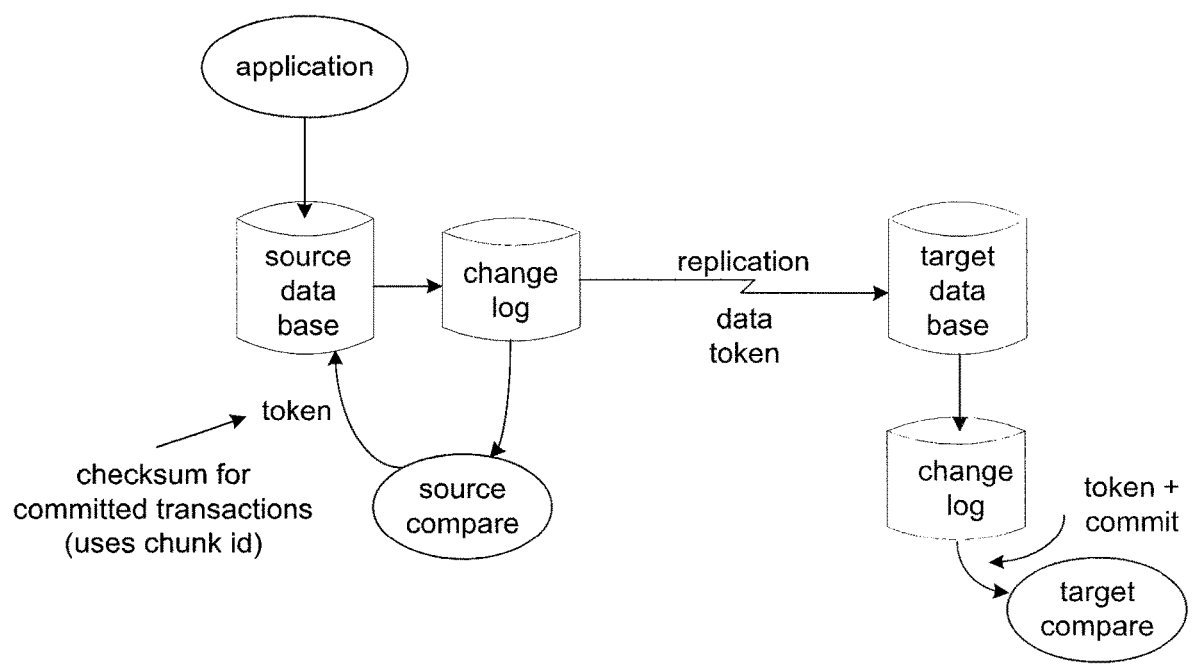
Figure 7: Comparing Change Logs via a Token

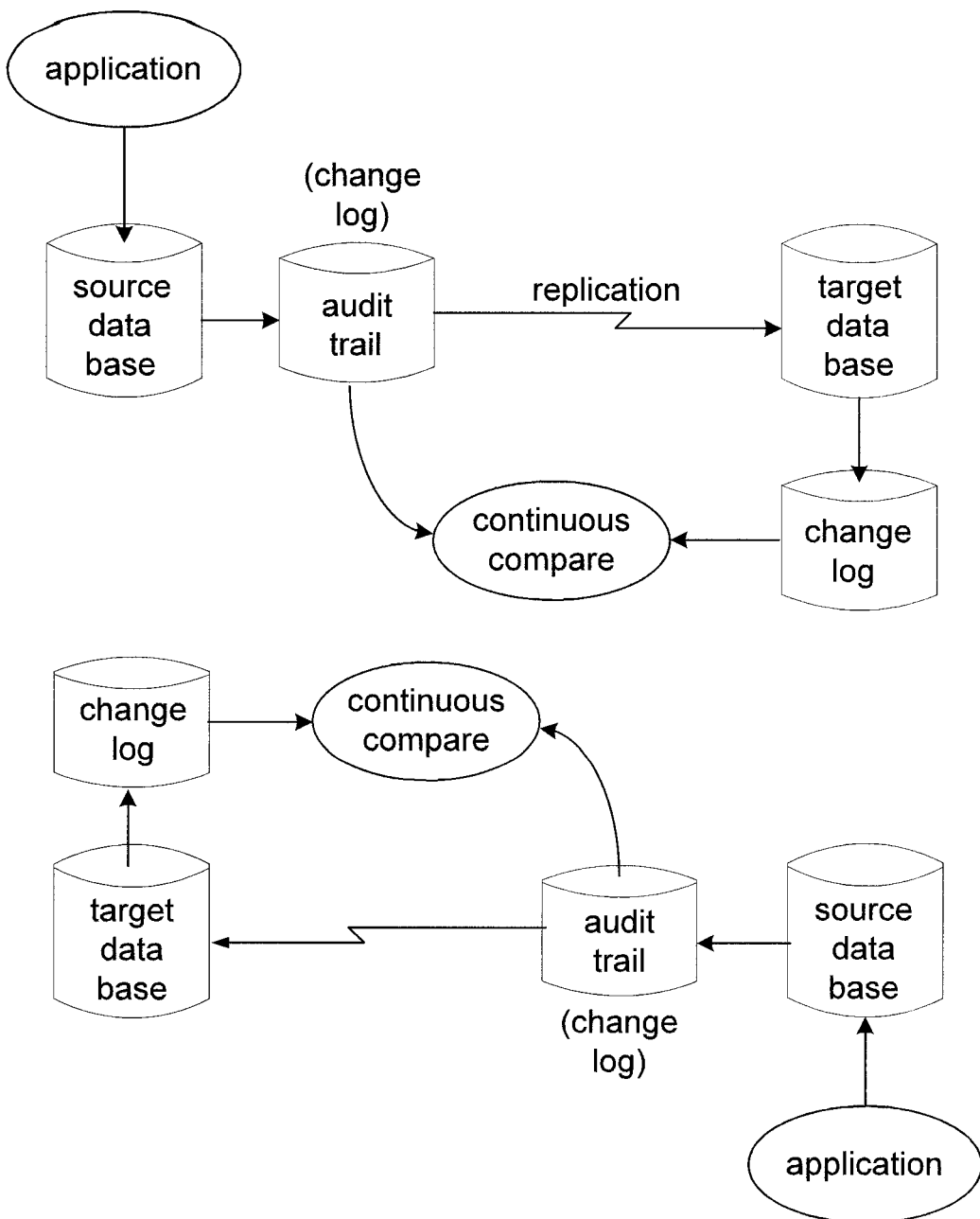
Figure 8: Comparing Changes in an Active/Active System

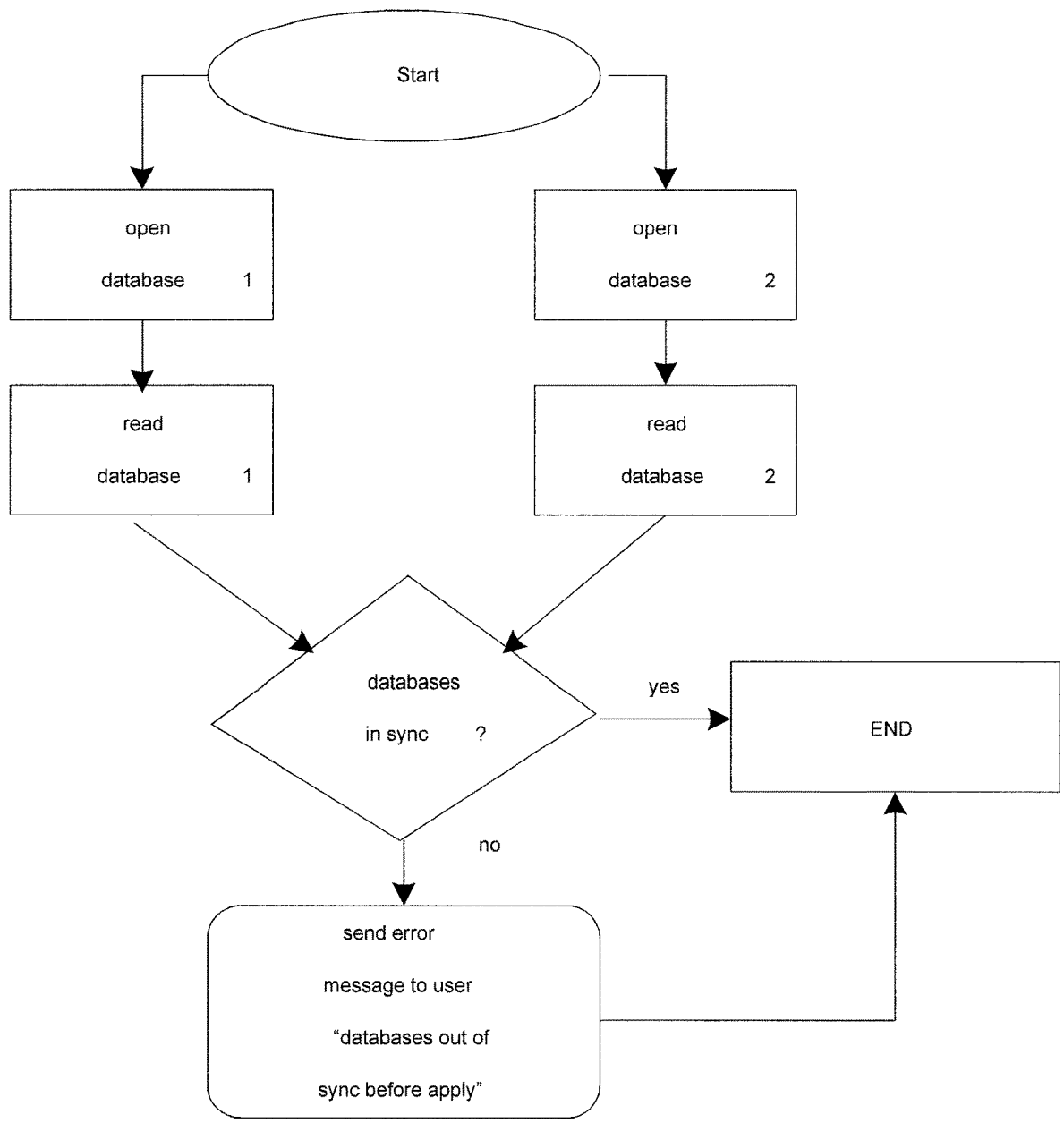
Figure 9: Continuous Compare – (Optional) Check if Databases in Sync at Start

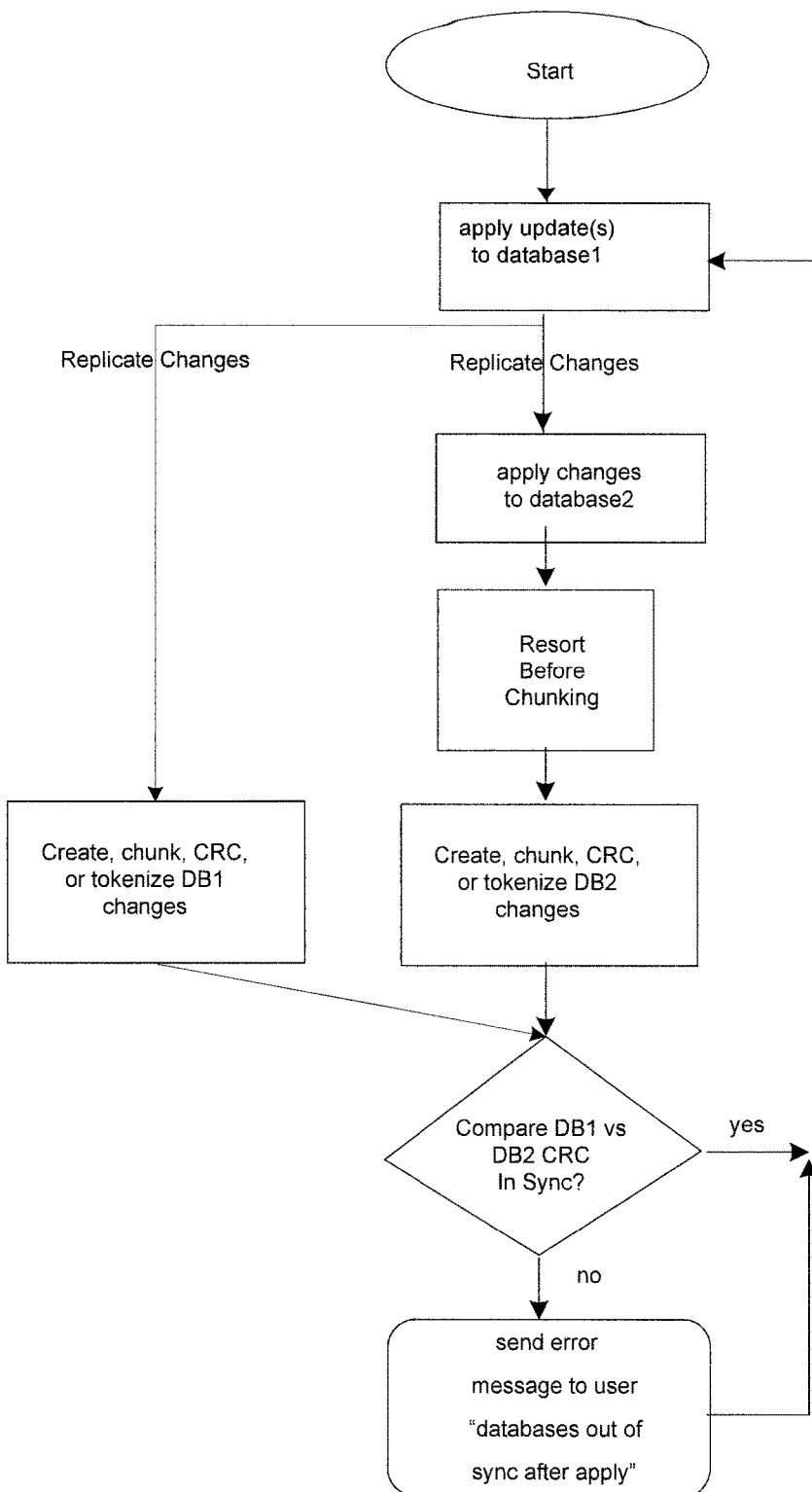
Figure 10: Continuous Compare – Compute and Compare CRC of Changes at Target Side

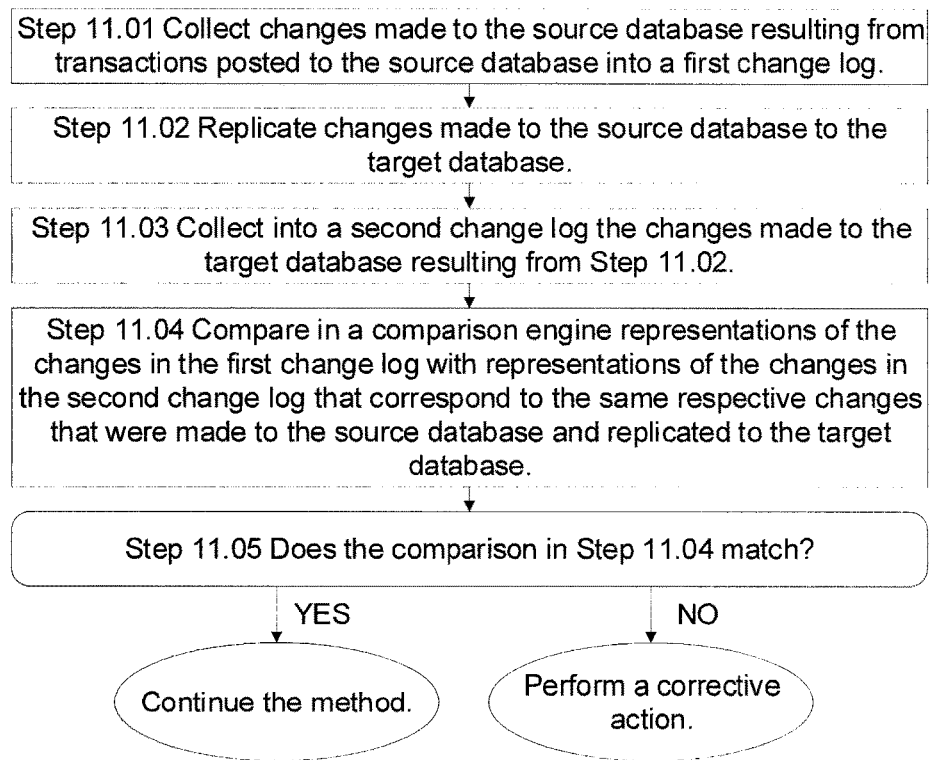
Figure 11: Flowchart for a preferred embodiment of an automated method for comparing a source database and a target database that are intended to be kept in synchronization with each other using replication

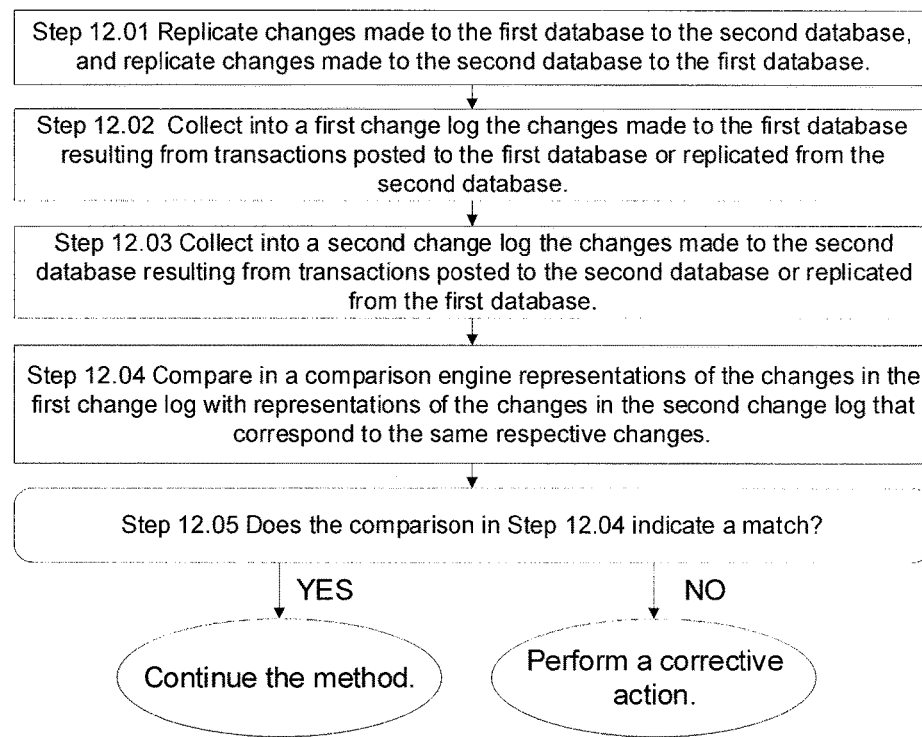
Figure 12: Flowchart for a preferred embodiment of an automated method for comparing an active-active database set that are intended to be kept in synchronization with each other using replication

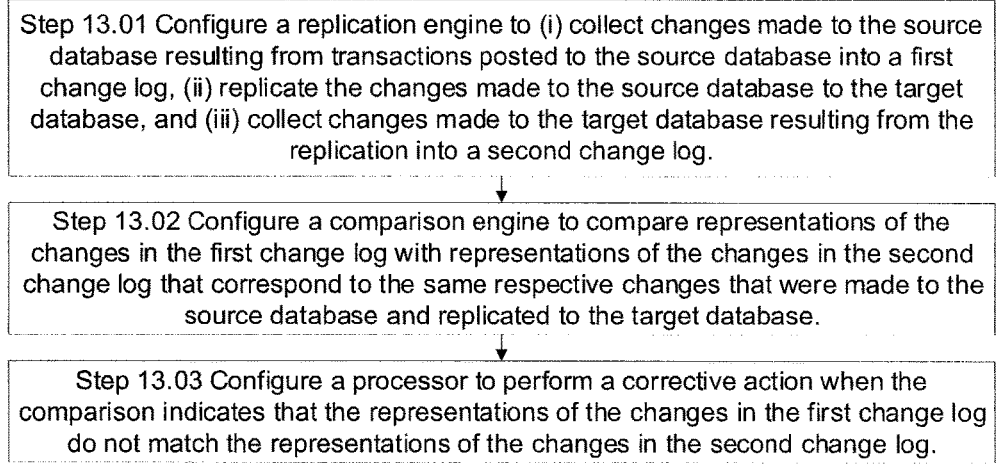
Figure 13: Flowchart for a preferred embodiment of an automated system for comparing a source database and a target database that are intended to be kept in synchronization with each other using replication

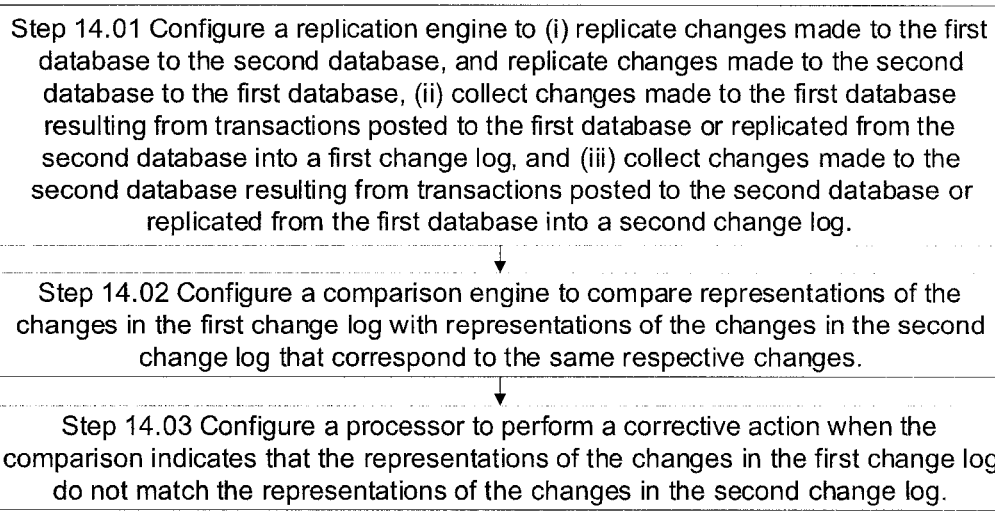
Figure 14: Flowchart for a preferred embodiment of an automated system for comparing an active-active database set that are intended to be kept in synchronization with each other using replication

METHOD AND APPARATUS FOR USING REPRESENTATIONS OF BLOCKS OF DATA WHEN CONTINUOUSLY COMPARING TWO DATABASES WHICH ARE ACTIVELY BEING KEPT SYNCHRONIZED

CROSS-REFERENCE TO RELATED APPLICATIONS

This application is a continuation of copending U.S. application Ser. No. 18/476,784 filed Sep. 28, 2023, which, in turn, is a continuation of U.S. application Ser. No. 17/466,212 filed Sep. 3, 2021, now U.S. Pat. No. 11,775,560, which, in turn, is a continuation of U.S. application Ser. No. 16/548,012 filed Aug. 22, 2019, now U.S. Pat. No. 11,120,047. Each of the above-identified applications are incorporated by reference herein.

This application claims the benefit of U.S. Patent Application No. 62/721,215 filed Aug. 22, 2018, the disclosure of which is hereby incorporated by reference herein in its entirety.

BACKGROUND OF THE INVENTION

Certain terms used in the "Background of the Invention" are defined in the "Definitions" section.

1.1 Computer Applications

Much of our daily lives is augmented by computers. The many services upon which we depend, our banking, communications, air and rail travel, online shopping, credit-card and debit-card purchases, mail and package delivery, and electric-power distribution, are all managed by computer applications.

In its simplest form, as shown in FIG. 1, a typical computer application is generally implemented as one or more computer programs (1) running in a computer (2). A computer program is basically a set of computer-encoded instructions. It often is called an executable because it can be executed by a computer. A computer program running in a computer is called a process, and each process has a unique identification known to the computer. Multiple copies of the same computer program can be running in a computer as separately distinguishable processes.

An application typically includes multiple interacting processes.

1.2 Application Database

With reference to FIG. 1, an application often depends upon a database (3) of information that the application maintains to record its current state. Often, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

The information in the databases is frequently organized into one or more files or tables, although there are many other ways of organizing the information contained in the database. Each file or table typically represents an entity set such as "employees" or "credit cards." A file comprises records, each depicting an entity-set member such as an employee. A table comprises rows that define members of an entity set. A record comprises fields that describe entity-set attributes, such as salary. A row comprises columns that depict attributes of the entity set. In this specification, "files" are equivalent to "tables;" "records" are equivalent to "rows;" and "fields" are equivalent to "columns."

1.3 Requests

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can request or use the services that it provides.

An example of an incoming request from an end user is a request for a bank-account balance. Another example is an alert that a circuit breaker in a power substation has just tripped. In some cases, there may be no incoming request. For instance, a computer application may on its own generate random events for testing other applications.

1.4 Request Processing

As shown in FIG. 1, the application receives a request from an incoming end user (5). As part of the processing of this request, the application may make certain modifications to its database (6).

The application can read the contents of its database (7). As part of the application's processing, it may read certain information from its database to make decisions. Based on the request received from its incoming end user and the data in its database, the application delivers certain services (8) to its outgoing end users (9).

1.5 Services

A service may be delivered by an application process as the result of a specific input from an end user, such as providing an account balance in response to an online banking query. Another example of a service is the generation of a report upon a request from an end user.

Alternatively, the application program may spontaneously deliver a service, either on a timed basis or when certain conditions occur. For instance, a report may be generated periodically. Alternatively, an alarm may be generated to operations staff if the load being carried by an electric-power transmission line exceeds a specified threshold.

The end users providing the input to the application may or may not be the same end users as those that receive its services.

1.6 Availability

The availability of a computer system and the services it provides is often of paramount importance. For instance, a computer system that routes payment-card transactions for authorization to the banks that issued the payment cards must always be operational. Should the computer system fail, credit cards and debit cards cannot be used by the card holders. They can only engage in cash transactions until the system is repaired and is returned to service.

The failure of a 911 system could result in the destruction of property or the loss of life. The failure of an air-traffic control system could ground all flights in a wide area.

In mission-critical systems such as these, it is common to deploy two or more computer systems for reliability. Should one computer system fail, the other computer system is available to carry on the provisioning of services.

1.7 Redundant System

The availability of a computing system can be significantly enhanced by providing a second system that can continue to provide services to the end users should one system fail. The two systems can be configured as an active/backup (or active/standby) system or as an active/ active system. The systems are interconnected via a computer network so they can interact with each other. In an active/backup system (FIG. 2), the active system is keeping its backup system synchronized by replicating database changes to it so that the backup system is ready to immediately take over processing should the production system fail. A uni-directional data replication engine is typically used to replicate the database changes from the active system to the standby system. In an active/active system (FIG. 3), both systems are processing transactions. They keep each other synchronized via bi-directional data replication. When one system processes a transaction and makes changes to its database, it immediately replicates those changes to the other system's database. In that way, a transaction can be routed to either system and be processed identically. Should one system fail, all further transactions are routed to the surviving system.

1.8 Database Integrity

It is imperative that the two databases in a redundant system be exact copies of each other, and that any differences between them (that are not caused by normal data replication latency) are quickly identified and resolved, else subsequent processing could return erroneous or inconsistent results. Database errors could be introduced for a variety of reasons, for example due to anomalies in the Audit Trails (Change Logs) that drive the data replication engines, or if some of the data to be replicated is lost. Alternatively, faults in the data replication engine(s) could cause the redundant databases to diverge, or direct updating of only the backup database by the application or users can also cause the divergence.

1.9 Methods for Comparing Two Databases to Ensure they Match

Several prior art methods exist for comparing two databases to make sure they match (as discussed below). For example, the SOLV product from Gravic, Inc., USA takes a copy of some (or all) of the data in one of the databases, and sends it to a daemon that reads a similar data set from the other database, comparing each field or column of every record or row in the copy to make sure they match. Using SOLV, extra data, missing data, or data in both databases that has divergent data subsets (eg a field or column in a record or row does not match), can be identified and resolved.

Still other prior art database comparison tools will "chunk" the first database into data sets, computing a hash, CRC, token, or other fingerprint representing that data set (collectively "data fingerprint"), and send just the data code to the daemon that reads and computes a data code representing the data set on a similar data set on the other database. This approach lessens the load on the network, however it still requires re-reading the contents of the two databases (or subsets thereof) to perform the comparison, even if most of the data in the database(s) has not changed.

The prior art that compares databases has several features in common:

A. They typically compare a known range (or block) of records—either the entire file, or a specific range (or block) within the file, or a specific sample of records.

B. They typically compare the records using a specific ordering of records (e.g., either physical order or logical order such as a key path).

C. They typically compare all records in the range, whether or not records have changed since the last comparison. In some cases, a statistical sampling of the records is taken, making sure to compare the records selected on the source to the same records in the target.

D. If comparing blocks of records, any block marked as having been changed typically has its entire contents compared (or used in the comparison).

These characteristics of the prior art lead to limitations in the use of file comparison to continuously validate that two databases are equivalent and remain equivalent as they change over time. The limitations are described below.

All of the prior art listed above can verify database correctness at a specific moment in time—that is, when the database compare operation has completed. They cannot say the database is correct after additional updates have been applied to the database. To do so, another database comparison must be run. However, database comparisons are typically long running, resource intensive tasks which prevent them from being run frequently. Most organizations rely on infrequent database comparisons (for example, monthly, weekly, daily, or perhaps even hourly). If, for some reason, the two databases fall out of correspondence during the period between comparisons, the target system will be using invalid data if it is required to takeover processing.

1.11 What is Needed

Databases can be extremely large—terabytes of data may be stored in them. Therefore, comparing the entire databases using current, state of the art approaches, would take a very long time and use a lot of system resources, limiting the usefulness of those approaches. And, these approaches would not immediately identify data differences, at least until a subsequent comparison operation that included the diverging data was run. A means for more efficiently comparing two databases in a redundant system is needed to ensure that the databases remain synchronized. In general, what is needed is a method of continuously comparing database table data without reprocessing the entire database table.

BRIEF SUMMARY OF THE INVENTION

Comparing just the changes either made or to be made to two databases which are actively being synchronized requires comparing much less data, and it focuses the effort on just the data that has changed, thereby identifying discrepancies much more quickly. This form of comparison can be done regardless if the two databases start out synchronized or not (however, if the two databases are not synchronized to start, then any data differences for data that is not changed will not be immediately identified). Comparing just the database changes can be accomplished in real time as the databases are updated. Changes made to a database are captured in a Change Log. In HPE NonStop systems, for instance, the Change Log is the TMF Audit Trail. An Oracle database maintains a Change Log, called the Redo Log, of the changes that have been made to an Oracle database. A DB2 database maintains a Change Log, called a Journal, of the changes that have been made to a DB2 database. Because they are much smaller, the Change Logs of a redundant system can be compared in real time using far fewer system resources to ensure that the same changes are being applied (or have been applied) to both databases. This is a form of what is herein called "Continuous Compare." Continuous Compare ensures that the redundant databases will always be synchronized or that discrepancies will be identified very quickly, at least for the parts of the database(s) which have been changed.

Definitions

The following definitions describe the use of certain terms in this specification. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that holds a single attribute, such as SALARY, of the entity set.

Field—A file component that holds a single attribute, such as SALARY, of the entity set. In this specification, the term "column" or "field" is to be interpreted as "column and/or field."

Row—A table component that represents an entity instance. It is represented as a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30, 000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The removal of a row from a database.

Change—An insert, update, or delete.

Function—A logical implementation of a task or service.

Program—An executable set of programming code for providing a specific function or set of functions.

Executable—A program.

System—A processor with memory and input/output devices that can execute a program.

Computer—A system.

Node—A computer that is one of the two or more nodes, i.e. systems, that make up a redundant system.

Process—A program running in a computer. A process provides one or more functions. One program can be spawned as multiple distinguishable processes.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that it provides.

Data Replication—A method or procedure for replicating the database changes made to one database (often called the 'source' database), to a second database (often called the 'target' database), in order to keep the databases synchronized (having the same or similar content). Data replication can replicate all changes or some changes, and the source and target data formats may be the same or different. In a typical redundant database environment (such as discussed in this document), the source and target databases are meant to contain the same information, for example to support classic business continuity failover needs.

Data Replication Latency—the time from when a change is made on the source database to when the replication engine has applied that change against the target database is called the 'data replication latency'. It is often measured in sub-seconds to seconds. However longer latencies can occur, for example, if the network interconnect between the databases is unavailable for a while. It is typical for a source database and a target database to be divergent for the specific data changes being replicated during the data replication latency time period; however, this divergence resolves itself and the data becomes convergent (the same) as the changes are applied to the target database.

Active/Backup System—A redundant system architecture in which an active production system is backed up by a passive system that may be doing other work. Should the active system fail, the backup system is brought into service; and the application continues running on the backup system. Failover from a failed active system to the backup system can take some time, ranging from minutes to hours. Furthermore, the failover may not work (a failover fault). Uni-directional data replication is typically used to keep the databases synchronized.

Active/Active System—A redundant system architecture in which two or more computing systems are actively processing transactions for the same application. Should one system fail. recovery only entails sending further transactions to the surviving system(s). Failover typically can be accomplished in seconds, and there are no failover faults (the surviving systems are known to be working). Bi-directional data replication is typically used to keep the databases synchronized.

Redundant System—A system architecture which consists of two or more systems (i.e. nodes) that are operating in a way to increase the overall availability of the application to end users. Active/Backup and Active/Active Systems are the two primary redundant system architectures. Data replication is typically used to keep the databases in the redundant systems synchronized.

Sizzling-Hot Takeover (SZT) system—An active/active architecture in which only one computing system is processing transactions. An SZT system avoids the problems that an application might face if run in a distributed environment (for example data collisions), but it has the fast and reliable failover characteristics of an active/active system.

Backup—Creating a copy of a database to protect it from loss.

Online Backup—Creating a copy of an active database to protect it from loss.

Restore—Restoring a database in a consistent state by loading a backup copy and rolling forward changes that occurred to the backup copy once the backup was started but before it was completed.

Virtual Tape—Magnetic tape images on a disk, which may be remote from the source system.

Change Log—A record of changes made to a database. It usually consists of a before image (a copy of the original value of the data that was changed) and an after image (a copy of the final value that the data was changed to be). For example, for an insert change, the before value is null and the after value contains the inserted data. For an update change, the before value is the original data value, and the after value is the final data value. For a delete change, the before value is the original data value, and the after value is null.

Audit Trail—analogous to a Change Log.

Current Image—the current image is the current value of a data item (eg a record or a row) that is in the database.

Related Data—data that must be consistent between all the data items in the data set. For example, a parent row and a child row in a classic referential integrity relationship are related. Updates to the same record or row are related as well—replicating the updates out of order can lead to inconsistent data. Non-related data is data that does not have a consistency requirement, for example the address field for a customer not involved in a transaction contains non-related data.

Consistent Database—A database is consistent if its data is valid according to all defined rules, at least for related data. For instance, a parent row must exist for every child row that refers to it.

Replicated consistent databases or synchronized databases—a pair (or more) of databases is consistent (or synchronized) with each other if the data contents of the databases match (except perhaps for the data changes being replicated during the data replication latency time period).

Record-Oriented Database—A database that is accessed by specifying a key pointing to one or more records.

Field-Oriented Database—A database that is accessed by specifying a key pointing to a field.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments.

However, the invention is not limited to the precise arrangements and instrumentalities shown. In the drawings:

FIG. 1 shows a prior-art computer application.

FIG. 2 shows a prior-art active/backup system with nodes connected by a computer network.

FIG. 3 shows a prior-art active/active system with nodes connected by a computer network.

FIG. 4 shows a Continuous Compare with chunks in the same order.

FIG. 5 shows source/target commit order.

FIG. 6 shows comparing Change Logs via CRCs

FIG. 7 shows comparing Change Logs via tokens.

FIG. 8 shows comparing Change Logs in an active/active system.

FIG. 9 shows an optional step to check whether the databases are in sync before a continuous compare starts.

FIG. 10 shows a Continuous Compare algorithm with the chunking of the source database changes done on the target side.

FIG. 11 shows a flowchart for a preferred embodiment of an automated method for comparing a source database and a target database that are intended to be kept in synchronization with each other using replication.

FIG. 12 shows a flowchart for a preferred embodiment of an automated method for comparing an active-active database set that are intended to be kept in synchronization with each other using replication.

FIG. 13 shows a flowchart for a preferred embodiment of an automated system for comparing a source database and a target database that are intended to be kept in synchronization with each other using replication.

FIG. 14 shows a flowchart for a preferred embodiment of an automated system for comparing an active-active database set that are intended to be kept in synchronization with each other using replication.

DETAILED DESCRIPTION OF THE INVENTION

Certain terminology is used herein for convenience only and is not to be taken as a limitation on the present invention.
Using the Change Logs to Compare Databases This invention presents a solution that uses the Change Logs generated, typically by the database managers, on both systems to continuously compare the changes to the tables. Using the Change Logs instead of directly comparing the files or tables limits the range of comparison to only those records that have actually been modified, rather than comparing all records (regardless of whether they have changed) as is done in the prior art. The present invention can thus use less system resources, run faster, and can identify discrepancies much sooner than the prior art approaches can.

Typically, a target database is kept synchronized with the source database via a data replication engine. This facility sends changes made to the source database as found in the source Change Log to the target system and applies these changes to the target database, where they are added to the target Change Log. Thus, when data replication is used, there is a latency (the data replication latency) between when a change is added to the source Change Log and when it is added to the target Change Log. This delay should be taken into account if the Change Logs are to be compared.

Several different implementations of the proposed invention are discussed below. All of the implementations follow the same general steps:

A. (Optional) Start with the source and target databases (file(s) and/or table(s)) in a known synchronized state (for example, from a copy or load operation, or from a backup/restore operation, etc).

B. (Optional) Validate the initial correctness of the table or file using one of the prior art solutions to compare the file. Although not required, this step helps identify divergence causes and locations if they later occur.

C. Establish a starting boundary in the Change Log for both the source and target system such that the target change log correlates with the same point in the source change log offset by replication latency.

D. Monitor the Change Logs on both systems, extracting change information for each file being continuously compared.

E. Establish an end boundary to the comparison, which also serves as a start boundary for the next comparison.

F. Validate that data in their respective Change Logs has caused the same modifications to the source and target databases.

G. There are several advantages to using the Change Logs to continuously validate that two databases are synchronized:

a. Only the data that has changed is examined, resulting in a more efficient and faster comparison.

b. The validation is near real-time. Even if the comparisons using the prior art were continuously rerun, an erroneous change in one database to a record immediately after it had been compared would not be picked up until a full cycle of the file comparison had completed and the record had been reverified.

c. In the preferred implementation, the actual source and target tables are not even accessed during the comparison. The comparison just uses the data in the Change Log. This allows the continuous comparison to run without affecting the database performance. It also provides an additional level of security as the entire database file or table does not need to be accessed.

d. False positives that are common with other techniques are avoided. False positives are mismatches that can occur when the databases are opened for updating while the compare runs. A false positive mismatch can occur when the source record or row has been changed, the change is being propagated to the target database by the replication engine, but it has not yet been applied when the comparison is performed (in other words, a false positive can occur for data during its data replication latency time period). This issue is avoided by the Continuous Compare approach because it only compares data after it has been changed on each side.

There are several significant issues that arise when using the Change Logs for comparison:

1. Record ordering: Events may not be in the same order in the source and target Change Logs. The Change Log itself may not guarantee the order of the events matching the order in which they were applied to the database, and the replication engine may apply the events out of order. If this occurs, the records in the Change Log either need to be reordered to match, or the data fingerprint and/or comparison algorithm needs to be immune to record ordering problems.

2. Range limitation: One of the salient features of the prior art is that they compared a known set of records by limiting the range of the comparisons. With a Change Log, no such ranges exist. Instead, an alternative approach such as a temporal range may be used to limit the comparison—comparison via Change Logs requires comparing the changes made to a file during the same time period (for example, if the replication latency is five minutes, compare the current target change log events to the source change log events from five minutes prior). It may also be possible to use a count of Change Log events or perhaps all events in between a set of tokens inserted into the Change Logs. Or, for databases such as Oracle that maintain a system change number (SCN), compare the changes grouped by SCN (offset by replication latency).

3. As noted above, the prior art requires limiting the range of comparison done in a step (possibly to the entire file, but more frequently to subsets of the file). Continuous Comparison via the Change Logs also requires breaking the comparisons into subsets. However, instead of using record boundaries as the subset, the Change Logs need to broken into subsets based upon other boundaries so that the changes that are applied on one side during the boundary can be compared to the changes applied to the other side.

In some cases, simple time ranges cannot be used for bracketing the subsets for comparison. Both replication latency (the time it takes for a change from the source system to be sent to and applied on the target system) and the difference in order between the events in the source and target Change Logs can prevent this from being a feasible solution.

The subsets cannot always be bracketed by specific change events to the files. Again, the fact that the ordering of change events may be significantly different on the source and target systems will prevent the subsets from being consistent.

Instead, a preferred embodiment of the algorithm uses commits to break the continuous stream of change events into subsets for comparisons. Replication systems, whether using commit ordering or landed (e.g. physical) order, typically maintain commit order to maintain data consistency. This allows the commits to be used as boundaries: the same changes should have been applied by the replication system to the target as were applied to the source system between commits if database systems are remaining synchronized. At a minimum, this should be true for the files and tables that were updated by a specific set of committed transactions. And, it may also be required to only compare the data for committed transactions during that boundary as uncommitted data (that may later abort) or data that has already aborted may be out of order or in an indeterminate order.

Several anomalies may cause the databases to diverge. For one, someone may have made changes to the target database that are not reflected in the source database. Replication could have been misconfigured and is not replicating some or all of the data. Someone may have turned audit off (source and/or target) and the changes are not being recorded in the Change Log (in this case, the continuous compare should verify that the changes are being recorded and watch for any change otherwise). A continuous compare allows the divergence to be detected in real-time and quickly corrected (for example, a rules engine could be used to specify the actions to take when certain types of divergence is encountered).

Chunking Changes

Rather than comparing files, the Change Logs are compared instead. In this way, only changed data is compared rather than the entire database. For a large database, this can limit the comparison to perhaps hundreds of megabytes rather than hundreds of terabytes. Rather than comparing the changes directly one at a time, the changes in the change logs can be chunked (or batched) into large groups of changes. Each chunk can be characterized by a data fingerprint, and chunks can be compared simply by comparing their data fingerprints. If the data fingerprints match, then the changes contained within the chunks match. The chunks of the Change Logs may not be in order. They therefore should be reordered, perhaps temporally, so that they can be compared (or the data fingerprint and/or comparison algorithm should be immune to the data being out of order). The Change Logs may be heterogeneous in that they may be in different formats because their associated databases are in different formats. If this is the case, the Change Logs should be reformatted to be in the same formats or translated to be compared properly. There are several cases that should be considered.

Case 1: Events in the Change Logs are in the Same Order

This is the simplest case and may not always be realistic. In this case, the events in the Change Logs are in the same order (FIG. 4). Therefore, the source and target chunks are in the same order. The data replication engine is reading data from the Change Log, and replicating it to the target database, where it applies the changes into the target database. As the data replication engine reads data from the source Change Log, it can chunk it (similarly, the chunking can occur at the target side once the data to be replicated is received). As the replicated data is applied to the target database, the target database Change Log entries are created, and the target Change Log can be chunked accordingly. The chunks in the replication engine (from the source side) are compared to the chunks in the target database Change Log; and if they are the same, then it is known that the target database has been properly updated and the databases match. Note that in this and the other cases, the chunks can consist of the individual change log events or a data fingerprint representation of the Change Log events.

Case 2: Events in the Change Logs are not in the Same Order (Chunks are Out of Order)

In this case, the events in the Change Log (and hence the chunks created from them) are out of order and should be reordered. This can be done via the use of timestamps, a system change number (e.g., the SCN that Oracle uses to group its Change Log events), or an embedded identifier (e.g. a number) in each chunk. Again, the chunked data itself or the data fingerprints of each pair of chunks in the data replication engine and the target Change Log are compared. It they match, then the chunks are identical and the replication is correct.

Case 3: Chunks Cannot be Resequenced

What if the chunks cannot be resequenced? The Change Log typically contains committed data (i.e., the events in a transaction that committed), uncommitted data (i.e., the events in a transaction that has not yet ended), and rollback data (i.e., the events in a transaction that aborted; in this case, the UNDO of the events (i.e. the before images) may also be included). The replication engine typically replicates transactions in commit order. Commits on the target are in the same order as commits on the source, at least for related data, as shown in FIG. 5. Optionally, start off with two databases that match. The match can be guaranteed by comparing the two databases, loading the target database with the source database, backing up the source database and restoring it on the target, or other methods. Alternatively, this approach will detect differences when the source and target databases start out out-of-order, assuming that some of the mismatched data has just been updated. The Continuous Comparison program chunks the source Change Log. Alternatively, this function can be performed by the replication engine. The chunks include only committed transactions. Uncommitted data is held for later chunks. The current chunk includes data from previous time periods that just committed in this time period. The chunk is tagged by calculating a data fingerprint for it. If desired, multiple chunks could be tagged with a common data fingerprint, in which case there is a tag for every N chunks. As chunks of changes are applied to the target database, these updates flow through to the target Change Log. The Continuous Comparison generates equivalent chunks from the data applied to the Change Log. If the data replication engine chunks and the Change Log chunks match as shown in FIG. 4, then the source and target databases have stayed synchronized. It may not be necessary to ensure correct synchronization of all files. A list of files that should be checked can be provided to the continuous comparison mechanism. In this case, only the changes to the specified files are extracted and chunked for comparison.

Case 4: Change Log Continuous Compare

Transactions are typically committed on the target database in the same order as they are committed on the source database. The Audit Trail is a Change Log for the source database. As changes are added to the target database, they are added to a target Change Log, as shown in FIG. 6. Comparing the before images of the source database to the before images of the target database tells you if the two databases were properly synchronized before applying the changes. Comparing the before image of the source database to the current image of the target database also tells you if the two databases were properly synchronized before applying the changes. However, in this case the comparison is done before the change is applied at the target database—hence the change may not be made depending on user desire if they decide not to complete the transaction. Comparing the after images of the source database to the after images of the target database tells you if the two databases are properly synchronized after applying the updates. If the databases are not synchronized, an error describing the mismatch can be posted to the user and/or the change can be applied to the target database to synchronize it with the source database. The changes to the source database as reflected in the source Change Log are compared to the changes to the target database as reflected in its Change Log on an ongoing and continuous basis. As long as they are the same, the databases remain synchronized. Rather than comparing the details of the multiple changes themselves, which would require a great deal of processing power, a data fingerprint such as a CRC (cyclic redundancy check) or hash can be calculated for each set of changes in the Change Logs, as shown in FIG. 6. The data fingerprints can then be compared, and if they match it is known that the changes being made to the target database are the same as the changes that were made to the source database. Alternatively, the source system could generate a token that is a checksum for a range of committed transactions, as shown in FIG. 7. The token would be added to the source database and replicated to the target system where it would make its way to the target Change Log via the target database. The target system compares the token to its own generated token, and if the tokens compare, the target database has made the same changes as the source database and remains synchronized with the source.

Case 5: Comparing Blocks

The previous descriptions have described the Continuous Compare invention as comparing the Change Logs of the source and target databases. In effect, this method is comparing the records (or rows) of the two databases to ensure that they are identical. An alternative approach is to compare the blocks of data that make up the databases. Typically, only those blocks that have changed need to be compared. Typically, each block should contain only completed transactions (whether committed or aborted). Since a block typically contains a number of records, this method can potentially speed up the Continuous Compare process.

Continuous Compare for Data that is Assigned a Value on Write

In some file systems, the change data that is being applied into the target database cannot be assigned the same data values as were assigned at the source. This is because that particular file system does not allow the replication engine to assign the value when it inserts the data into the target database (for example, for an internal SQL sequence generator column). In these cases, these fields (or records) could be removed from the change data that is being compared.

Detecting Data that is Different Before Replication Vs Detecting Data that is Different after Replication The preceding sections have mostly discussed methods for using continuous comparisons for detecting database differences after the changes have been made to both the source and target database; in other words, it compares the changes that persist after the data has been applied to the source, and replicated and applied to the target. This is accomplished by having the data replication engine send the after image of the source database change to the target system, and then comparing the after image of the source database change with the after image of the target database change.

A slight modification to the algorithm can also detect database differences that existed before the changes were made to both databases. In this additional feature, after the source change is made, the replication engine sends (or chunks) both the before image of the source change, as well as the after image of the source change. When the replicated data is applied to the target environment, compare the source's before image to the target database's before image; if the two match, then both databases were in sync before the change was made at either of them. If they do not match, then the two databases were not in sync before the changes were made.

Another slight modification to the algorithm can also detect database differences that exist after the changes are made to the source system but before the changes are made to the target system. In this additional feature, the replication engine sends (or chunks) both the before image of the source change, as well as the after image of the source change. When the replicated data is received at the target environment, read the target database to find the proper target record or row and read it, if it exists. Then compare the source's before image to the target database's current image; if the two match, then both databases are in sync before the change is made. If they do not match, then the two databases are not in sync before the change is made; depending on the application and nature of the data in the database, you can perform an appropriate action (such as pausing for user input, for example to stop processing, skip the event, or apply it anyway) before proceeding.

Regardless, it is the after images that determine whether the source and target databases are in sync after the changes are replicated and applied, and this is the typical desired outcome for continuous compare to validate: regardless of the state of the databases before the change was applied at each database, make sure that the databases match after the change is applied to both databases.

Active/Active Systems

The preceding sections have discussed continuous comparisons for Active/Backup (or active/passive) systems, as well as the sizzling-hot-takeover system. In an such systems, only the replication engine should be applying changes on the backup system—changes applied on the backup only will cause the database to diverge and will be detected by the continuous compare processes (this approach can be used to quickly detect configuration errors where the application is pointing to the wrong database to update). In an Active/Active system, changes are applied by the application (or by separate copies of the application) on both systems (of course, this solution also applies to environments with more than two systems). The replication system replicates the changes generated by the application on one node to the other node to keep the databases synchronized. Note that the replication system needs to filter the changes so only the changes generated by the application are replicated. Changes generated by the replication system should not be replicated back to the originating node; in other words, data oscillation should be avoided.

If the continuous compare processes compared all changes on both nodes in an Active/Active system, it would generate erroneous mismatches. The solution is to perform two continuous compares, one comparing the application changes on Node 1 to the changes made by the replication engine on Node 2, and one comparing the application changes made on Node 2 to those made by the replication engine on Node 1, as shown in FIG. 8 (note that the figure breaks the database into a source database and a target database on each system, whereas it is actually a single database on each node acting as both a source and a target). In this way, continuous compare will ensure that replication is operating correctly in each direction and that the databases remain synchronized, even though they are actively being updated by applications on each node. The solution can scale out to N systems by performing the same continuous compare logic between each pair of systems that are interconnected in the active/active environment.

Flowcharts

A flowchart for Continuous Compare is shown in FIG. 10. Note that an initial test to open, read, and compare whether the databases are in sync is optional and is shown in FIG. 9. FIG. shows that updates arrive at the first database (database1), and are applied to database1. The changes that result from these updates are replicated and applied to the second database (database2). In parallel (or serially), a chunk (or data fingerprint) is created from the changes in the database1 change log that represent the updates that have been applied to database1. The changes from the database1 change log are replicated and applied to database2. The changes resulting from applying the database1 change log changes into database2 (i.e., those in the database2 change log) may optionally need to be re-sorted before chunking, as described previously. A chunk (or data fingerprint) is created from the database2 change log changes, and is compared to the chunk (or data fingerprint) that resulted from the corresponding database1 changes. If they match, the databases have stayed in sync after the updates (changes) were applied to both databases, and the process continues. If they do not match, a discrepancy message can be logged and/or another appropriate action can be taken (such as suspending for operator input), and the process continues. Note that the figure shows the chunk (or data fingerprint) as being created for database1 on the target side, it can however be created on either the source or the target database side.

FIG. 11 is a flowchart for a preferred embodiment for comparing a source database and a target database that are intended to be kept in synchronization with each other, wherein an application processes transactions that are posted to the source database and replicated to the target database. During Step 11.01 changes made to the source database resulting from transactions posted to the source database into a first change log are collected. During Step 11.02 changes made to the source database are replicated to the target database. During Step 11.03 changes made to the target database resulting from Step 11.02 are collected into a second change log. During Step 11.04 a comparison engine compares representations of the changes in the first change log with representations of the changes in the second change log that correspond to the same respective changes that were made to the source database and replicated to the target database, wherein the source database and the target database are presumed to be in synchronization with each other when the comparison indicates that the representations of the changes in the first change log match the representations of the changes in the second change log, and wherein the source database and the target database are presumed not to be in synchronization with each other when the comparison indicates that the representations of the changes in the first change log do not match the representations of the changes in the second change log. During Step 11.05 corrective action is performed when the comparison indicates that the representations of the changes in the first change log do not match the representations of the changes in the second change log.

Variations on this embodiment include:
1. The corrective action is resynchronizing the target database with the source database,
2. The corrective action is suspending or stopping the application from processing transactions,
3. The representations of the changes in the first and second change logs are hash values of their respective changes,
4. The representations of the changes in the first and second change logs are hash values of batches of their respective changes,
5. The representations of the changes in the first and second change logs are the steps or operations of the transactions,
6. The source and target databases include rows of data which are modified by the transactions, and wherein the representations of the changes in the first and second change logs are before and/or after images of the rows of data which were modified by the transactions,
7. The changes made to the source database are replicated to the target database from the first change log, and
8. The changes made to the source database are replicated to the target database using dual writes.

FIG. 12 is a flowchart for another preferred embodiment for comparing a first database and a second database that are intended to be kept in synchronization with each other, wherein applications process transactions that are posted to the first and second databases, and replicated to each other. During Step 12.01 changes made to the first database are replicated to the second database, and changes made to the second database are replicated to the first database. During Step 12.02 changes made to the first database resulting from transactions posted to the first database or replicated from the second database are collected into a first change log. During Step 12.03 changes made to the second database resulting from transactions posted to the second database or replicated from the first database are collected into a second change log. During Step 12.04 a comparison engine compares representations of the changes in the first change log with representations of the changes in the second change log that correspond to the same respective changes, wherein the first database and the second database are presumed to be in synchronization with each other when the comparison indicates that the representations of the changes in the first change log match the representations of the changes in the second change log, and wherein the first database and the second database are presumed not to be in synchronization with each other when the comparison indicates that the representations of the changes in the first change log do not match the representations of the changes in the second change log. During Step 12.05 a corrective action is performed when the comparison indicates that the representations of the changes in the first change log do not match the representations of the changes in the second change log.

Variations on this embodiment include:
1. The corrective action is a resynchronizing the second database with the first database,
2. The corrective action is suspending or stopping the application from processing transactions,
3. The representations of the changes in the first and second change logs are hash values of their respective changes,
4. The representations of the changes in the first and second change logs are hash values of batches of their respective changes,
5. The representations of the changes in the first and second change logs are the steps or operations of the transactions,
6. The first and second databases include rows of data which are modified by the transactions, and wherein the representations of the changes in the first and second change logs are before and/or after images of the rows of data which were modified by the transactions,
7. The changes made to the first database are replicated to the second database from the first change log, and wherein the changes made to the second database are replicated to the first database from the second change log, and
8. The changes made to the first database are replicated to the second database using dual writes, and the changes made to the second database are replicated to the first database using dual writes.

FIG. 13 is a flowchart for yet another preferred embodiment for comparing a source database and a target database that are intended to be kept in synchronization with each other, wherein an application processes transactions that are posted to the source database and replicated to the target database. During Step 13.01 a replication engine is configured to:
(i) collect changes made to the source database resulting from transactions posted to the source database into a first change log,
(ii) replicate the changes made to the source database to the target database, and
(iii) collect changes made to the target database resulting from the replication into a second change log. During Step 13.02 a comparison engine is configured to compare representations of the changes in the first change log with representations of the changes in the second change log that correspond to the same respective changes that were made to the source database and replicated to the target database, wherein the source database and the target database are presumed to be in synchronization with each other when the comparison indicates that the representations of the changes in the first change log match the representations of the changes in the second change log, and wherein the source database and the target database are presumed not to be in synchronization with each other when the comparison indicates that the representations of the changes in the first change log do not match the representations of the changes in the second change log. During Step 13.03 a processor configured to perform a corrective action when the comparison indicates that the representations of the changes in the first change log do not match the representations of the changes in the second change log.

Variations on this embodiment include:
1. The corrective action performed by the processor is a resynchronization of the target database with the source database,
2. The corrective action performed by the processor is a suspension or stopping of the application from processing transactions,
3. The representations of the changes in the first and second change logs are hash values of their respective changes, 4. The representations of the changes in the first and second change logs are hash values of batches of their respective changes,
5. The representations of the changes in the first and second change logs are the steps or operations of the transactions,
6. The source and target databases include rows of data which are modified by the transactions, and wherein the representations of the changes in the first and second change logs are before and/or after images of the rows of data which were modified by the transactions,
7. The changes made to the source database are replicated to the target database from the first change log, and
8. The changes made to the source database are replicated to the target database using dual writes.

FIG. 14 is a flowchart for yet another preferred embodiment for comparing a first database and a second database that are intended to be kept in synchronization with each other, wherein applications process transactions that are posted to the first and second databases, and replicated to each other. During Step 14.01 a replication engine is configured to:
(i) replicate changes made to the first database to the second database, and replicate changes made to the second database to the first database,
(ii) collect changes made to the first database resulting from transactions posted to the first database or replicated from the second database into a first change log, and
(iii) collect changes made to the second database resulting from transactions posted to the second database or replicated from the first database into a second change log. During Step 14.02 a comparison engine is configured to compare representations of the changes in the first change log with representations of the changes in the second change log that correspond to the same respective changes, wherein the first database and the second database are presumed to be in synchronization with each other when the comparison indicates that the representations of the changes in the first change log match the representations of the changes in the second change log, and wherein the first database and the second database are presumed not to be in synchronization with each other when the comparison indicates that the representations of the changes in the first change log do not match the representations of the changes in the second change log. During Step 14.03 a processor configured to perform a corrective action when the comparison indicates that the representations of the changes in the first change log do not match the representations of the changes in the second change log.

Variations on this embodiment include:
1. The corrective action performed by the processor is a resynchronization of the target database with the source database,
2. The corrective action performed by the processor is a suspension or stopping of the application from processing transactions,
3. The representations of the changes in the first and second change logs are hash values of their respective changes,
4. The changes in the first and second change logs are hash values of batches of their respective changes,
5. The representations of the changes in the first and second change logs are the steps or operations of the transactions,
6. The first and second databases include rows of data which are modified by the transactions, and wherein the representations of the changes in the first and second change logs are before and/or after images of the rows of data which were modified by the transactions,
7. The changes made to the first database are replicated to the second database from the first change log, and wherein the changes made to the second database are replicated to the first database from the second change log, and
8. The changes made to the first database are replicated to the second database using dual writes, and the changes made to the second database are replicated to the first database using dual writes.

SUMMARY

The contents of two databases that are kept synchronized by applying changes made to the source database to the target database can be continuously compared in real time by comparing the Change Logs of the source and target databases. So long as the Change Logs agree, then it is known that the databases are synchronized and are identical, at least for that portion of the database that has been updated. An optional initial step of comparing the databases to ensure they are synchronized before the comparisons begin can be done to ensure the entire databases remain in sync while the subsequent updates are made and replicated. Alternatively, if they do not agree, a divergence can be immediately detected, and/or investigated, and/or corrected.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:
1. An automated method for comparing a source database and a target database that are intended to be kept in synchronization with each other, wherein an application processes database changes that are posted to the source database and replicated to the target database, and wherein the source database and the target database are made up of blocks of data, the method comprising:
(a) collecting blocks of data from the source database having database changes;
(b) replicating the blocks of data from the source database having database changes to the target database;
(c) reading blocks of data from the target database that correspond to the blocks of data from the source database having database changes;
(d) comparing in a comparison engine representations of the blocks of data from the source database having database changes with representations of blocks of data from the target database that correspond to the blocks of data from the source database having database changes,
wherein the source database and the target database are presumed to be in synchronization with each other when the comparison indicates that the representations of the blocks of data from the source database having database changes match the representations of blocks of data from the target database that correspond to the blocks of data from the source database having database changes, and wherein the source database and the target database are presumed not to be in synchronization with each other when the comparison indicates that the representations of the blocks of data from the source database having database changes do not match the representations of blocks of data from the target database that correspond to the blocks of data from the source database having database changes; and (e) performing a corrective action when the comparison indicates that the representations of the blocks of data from the source database having database changes do not match the representations of blocks of data from the target database that correspond to the blocks of data from the source database having database changes.

2. The method of claim 1 wherein the corrective action is resynchronizing the target database with the source database.

3. The method of claim 1 wherein the corrective action is suspending or stopping the application from processing database changes.

4. The method of claim 1 wherein the representations of the blocks of data replicated from the source database and the representations of the blocks of data read from the target database are hash values.

5. The method of claim 1 wherein each of the blocks of data replicated from the source database contains only completed transactions.

6. The method of claim 1, wherein each of the blocks of data replicated from the source database contains records or rows of the source database.

7. An apparatus for comparing a source database and a target database that are intended to be kept in synchronization with each other, wherein an application processes database changes that are posted to the source database and replicated to the target database, and wherein the source database and the target database are made up of blocks of data, the apparatus comprising:
- (a) a replication engine configured to:
  - (a) collect blocks of data from the source database having database changes;
  - (b) replicate the blocks of data from the source database having database changes to the target database;
  - (c) read blocks of data from the target database that correspond to the blocks of data from the source database having database changes;
- (b) a compare configured to compare representations of the blocks of data from the source database having database changes with representations of blocks of data from the target database that correspond to the blocks of data from the source database having database changes,
  - wherein the source database and the target database are presumed to be in synchronization with each other when the comparison indicates that the representations of the blocks of data from the source database having database changes match the representations of blocks of data from the target database that correspond to the blocks of data from the source database having database changes, and wherein the source database and the target database are presumed not to be in synchronization with each other when the comparison indicates that the representations of the blocks of data from the source database having database changes do not match the representations of blocks of data from the target database that correspond to the blocks of data from the source database having database changes; and
- (c) a processor configured to perform a corrective action when the comparison indicates that the representations of the blocks of data from the source database having database changes do not match the representations of blocks of data from the target database that correspond to the blocks of data from the source database having database changes.

8. The apparatus of claim 7 wherein the corrective action is resynchronizing the target database with the source database.

9. The apparatus of claim 7 wherein the corrective action is suspending or stopping the application from processing database changes.

10. The apparatus of claim 7 wherein the representations of the blocks of data replicated from the source database and the representations of the blocks of data read from the target database are hash values.

11. The apparatus of claim 7 wherein each of the blocks of data replicated from the source database contains only completed transactions.

12. The apparatus of claim 7, wherein each of the blocks of data replicated from the source database contains records or rows of the source database.

13. An automated method for comparing a source database and a target database that are intended to be kept in synchronization with each other, wherein an application processes database changes that are posted to the source database and replicated to the target database, and wherein the source database and the target database are made up of blocks of data, the method comprising:
- (a) collecting before images of blocks of data from the source database having database changes;
- (b) sending representations of the before images of blocks of data from the source database having database changes to the target database;
- (c) reading current images of blocks of data from the target database that correspond to the before images of blocks of data from the source database having database changes;
- (d) comparing in a comparison engine the representations of the before images of blocks of data from the source database having database changes with representations of current images of blocks of data from the target database that correspond to the before images of blocks of data from the source database having database changes,
  - wherein the source database and the target database are presumed to be in synchronization with each other when the comparison indicates that the representations of the before images of blocks of data from the source database having database changes match the representations of current images of blocks of data from the target database that correspond to the before images of blocks of data from the source database having database changes, and wherein the source database and the target database are presumed not to be in synchronization with each other when the comparison indicates that the representations of the before images of blocks of data from the source database having database changes do not match the representations of current images of blocks of data from the target database that correspond to the before images of blocks of data from the source database having database changes; and
- (e) performing a corrective action when the comparison indicates that the representations of the before images of blocks of data from the source database having database changes do not match the representations of current images of blocks of data from the target database that correspond to the before images of blocks of data from the source database having database changes.

14. The method of claim 13 wherein the corrective action is resynchronizing the target database with the source database.

15. The method of claim 13 wherein the corrective action is suspending or stopping the application from processing database changes.

16. The method of claim 13 wherein the representations of the before images of blocks of data sent from the source database and the representations of the current images of blocks of data read from the target database are hash values.

17. The method of claim 13 wherein the representations of the before images of blocks of data sent from the source database contain the before images of the blocks of data.

18. An apparatus for comparing a source database and a target database that are intended to be kept in synchronization with each other, wherein an application processes database changes that are posted to the source database and replicated to the target database, and wherein the source database and the target database are made up of blocks of data, the method comprising:
   (a) a replication engine configured to:
      (i) collect before images of blocks of data from the source database having database changes;
      (ii) send representations of the before images of blocks of data from the source database having database changes to the target database;
      (iii) read current images of blocks of data from the target database that correspond to the before images of blocks of data from the source database having database changes;
   (b) a compare configured to compare the representations of the before images of blocks of data from the source database having database changes with representations of current images of blocks of data from the target database that correspond to the before images of blocks of data from the source database having database changes,
      wherein the source database and the target database are presumed to be in synchronization with each other when the comparison indicates that the representations of the before images of blocks of data from the source database having database changes match the representations of current images of blocks of data from the target database that correspond to the before images of blocks of data from the source database having database changes, and wherein the source database and the target database are presumed not to be in synchronization with each other when the comparison indicates that the representations of the before images of blocks of data from the source database having database changes do not match the representations of current images of blocks of data from the target database that correspond to the before images of blocks of data from the source database having database changes; and
   (e) a processor configured to perform a corrective action when the comparison indicates that the representations of the before images of blocks of data from the source database having database changes do not match the representations of current images of blocks of data from the target database that correspond to the before images of blocks of data from the source database having database changes.

19. The apparatus of claim 18 wherein the corrective action is resynchronizing the target database with the source database.

20. The apparatus of claim 18 wherein the corrective action is suspending or stopping the application from processing database changes.

21. The apparatus of claim 18 wherein the representations of the before images of blocks of data sent from the source database and the representations of the current images of blocks of data read from the target database are hash values.

22. The apparatus of claim 18 wherein the representations of the before images of blocks of data sent from the source database contain the before images of the blocks of data.

* * * * *